United States Patent [19]

Pappas

[11] Patent Number: 4,835,787

[45] Date of Patent: May 30, 1989

[54] FUSION PUMPED LIGHT SOURCE

[75] Inventor: Daniel S. Pappas, Los Alamos, N. Mex.

[73] Assignee: The United States of America as represented by the United States Department of Energy, Washington, D.C.

[21] Appl. No.: 239,584

[22] Filed: Sep. 1, 1988

Related U.S. Application Data

[63] Continuation-in-part of Ser. No. 79,961, Jul. 31, 1987, Pat. No. 4,800,566.

[51] Int. Cl.$^4$ .......................... H01S 3/09; G21C 1/00
[52] U.S. Cl. ........................................ 372/73; 372/80; 376/146; 376/133
[58] Field of Search .................... 372/73, 80; 376/121, 376/122, 132, 146, 147, 133, 326

[56] References Cited

U.S. PATENT DOCUMENTS

| | | | |
|---|---|---|---|
| 4,110,703 | 8/1978 | Jalufka et al. | 372/73 |
| 4,292,125 | 9/1981 | Bers | 376/132 |
| 4,305,783 | 12/1981 | Ohkawa et al. | 376/146 |
| 4,746,484 | 5/1988 | Jassby | 376/146 |

OTHER PUBLICATIONS

Baldwin et al., "The Direct Pumping of Gamma Ray Lasers by Neutron Capture", Nuclear Science and Engineering 72, (1979), pp. 290-292.
G. H. Miley, "Direct Pumping of Lasers by Fusion Reactors", *Fusion Reactor Engineering-II*, pp. 633-634.
D. L. Jassby, "Feasibility of Laser Pumping with Neutron Fluxes from Present-Day Large Tokamaks", PPPL-2377, pp. 1-12 (Aug. 1986).
D. L. Jassby, "$^3$He Functions in Tokamak-Pumped Laser Systems", PPPL-2387, pp. 1-20 (Oct. 1986).
M. Greenwald et al., "Energy Confinement of High--Density Pellet-Fueled Plasmas in the Alcator C Tokamak", Phys. Rev. Lett. 53, No. 4, 352-355 (Jul. 23, 1984).
M. A. Prelas et al., "Nuclear Driven Flashlamps", Laser and Particle Beams 6, part 1, 25-62 (1988).
Thomas R. Loree et al., "Lasing XeO in Liquid Argon", Los Alamos National Laboratory report LA-UR-86-897 (1986).
F. P. Boody et al., "Progress in Nuclear-Pumped Lasers", *Radiation Energy Conversion in Space*, (AIAA, New York, 1978), pp. 379-410.
G. H. Miley, "Direct Nuclear Pumped Lasers-Status and Potential Applications", Proceeding of the Fourth Workshop on Laser Interaction and Related Phenomena, 4A, 181-220 (Editors Schwarz, Hora; 1977), pp. 181, 182, 185, 214-220.

*Primary Examiner*—William L. Sikes
*Assistant Examiner*—Georgia Y. Epps
*Attorney, Agent, or Firm*—Ray G. Wilson; Paul D. Gaetjens; William R. Moser

[57] ABSTRACT

Apparatus is provided for generating energy in the form of light radiation. A fusion reactor is provided for generating a long, or continuous, pulse of high-energy neutrons. The neutron flux is coupled directly with the lasing medium. The lasing medium includes a first component selected from Group O of the periodic table of the elements and having a high inelastic scattering cross section. Gamma radiation from the inelastic scattering reactions interacts with the first component to excite the first component, which decays by photon emission at a first output wavelength. The first output wavelength may be shifted to a second output wavelength using a second liquid component responsive to the first output wavelength. The light outputs may be converted to a coherent laser output by incorporating conventional optics adjacent the laser medium.

7 Claims, 3 Drawing Sheets

FUSION PUMPED LIGHT SOURCE

BACKGROUND OF THE INVENTION

This patent application is a continuation-in-part of pending U.S. patent application Ser. No. 07/079,961, filed July 31, 1987 now U.S. Pat. No. 4,800,566, issued Jan. 24, 1989.

This invention relates to neutron pumped light sources and, more particularly, to neutron pumped light sources, including lasers, having a fusion reactor as a source of high-energy neutrons. This invention is the result of a contract with the Department of Energy (Contract No. W-7405-ENG-36).

It is known to pump laser media using neutrons produced by a fission reaction. The neutrons interact with an intermediate material to produce energetic particles which thereafter excite a laser media to obtain a population inversion which produces a laser output. By way of example the following U.S. patents, incorporated herein by reference, teach various fission pumped laser:

1. Walter J. Fader, "Nuclear-Pumped Uranyl Salt Laser," U.S. Pat. No. 4,160,956, dated July 10, 1979, provides a $UO_2^{++}$ uranyl salt laser medium enriched with a $^{235}U$ fission source. Fission products are produce within the uranyl salt to interact with the $UO_2^{++}$ ion to produce a lasing ouptut from the uranyl salt.

2. George H. Miley et al., "Direct Nuclear Pumped Laser," U.S. Pat. No. 4,091,336, dated May 23, 1978, provides a neutron source, which is taught to be a nuclear reactor, to irradiate a cylinder coated with $^{235}U$ or $^{10}B$ and containing a laser medium of Ne—$N_2$. A "quasi steady-state" laser is taught, although no definition is provided for the term "quasi steady-state" other than in relation to the laser output.

3. Thomas G. Miller et al., "High Power Nuclear Photon Pumped Laser," U.S. Pat. No. 4,398,294, dated Aug. 9, 1983, provides a pulsed nuclear reactor for generating neutrons to produce gamma and x-ray energy through inelastic scattering with iron. The output energy then excites Xe to generate photons which are effective to excite a laser medium of Ar, $SF_6$, and $XeF_2$.

The prior art fission neutron sources are taught as pulsed neutron sources. Such sources are not suitable for appliations which require a continuous power source, e.g., laser communications. Also, fission reactors can not provide very high pulse repetition rates. Thus, fission neutron sources provide very little flexibility in application for the laser system.

Further, fission neutrons have relatively low energies, i.e., 1–2 MeV, and are further moderated by material between the fission source and the lasing media. Most of the energy released in a fission reaction is in the form of fission fragments, whose range is very limited and only a limited penetration is provided by these relatively high energy particles. Efficient uses of fission reactors result in radiation damage of high density lasing media. Thus, only relatively low density lasing media are possible, with resulting relatively low-energy outputs. Moderator materials inherent in fission neutron sources provide inefficient neutron sources. Fission sources also generate quantities of high-level radioactivity with concomitant safety and environmental concerns.

The introduction of a fissionable material between the fission neutron source and the lasing medium has been used to generate higher energy fission fragments for exciting more dense media and for larger volumes. However, pumping with energetic, charged particles, such as by fission fragments, tritons, protons, and alpha particles, in liquids has not been successful due to degradation of the media optical properties from the fission fragments. Accordingly, the high power densities available from liquid lasing media has not been realizable from fission neutron pumping.

There have been some suggestions for use of a fusion reaction to excite a laser medium. In George H. Miley et al., "Direct Pumping Of Lasers By Fusion Reactors," *Fusion Reactor Engineering*-II, p. 633, Miley et al. teach that a charged particle beam might be extracted from a fusion reactor for use with a chemical laser. Frederick P. Boody et al., "Progress In Nuclear-Pumped Lasers," in *Radiation Energy Conversion In Space*, (AIAA, New York, 1978), pp. 379–410, suggests application of a plasma focus device as a pulsed neutron source. A laser-driven D-T pellet would provide a microexplosion to generate the fusion reaction.

It should be noted that the term lasing medium, as used herein, refers to a material which can be excited to obtain a state population inverision whereby photons are produced as the excited state decays to a lower state. The output light may be incoherent for use as a "flashlamp" or may be amplified to form a coherent, or lasing, output. The production of a coherent or incoherent output is a function of the use for the output radiation and is not per se part of the present invention. The production of light as both coherent and incoherent output from nuclear fission sources is described in M. A. Prelas et al., "Nuclear Driven Flashlamps," Laser and Particle Beams 6 part 1, pp. 26–62 (1988), incorporated herein by reference.

None of the prior art references teach a continuous or long pulse fusion reaction as a neutron source, where the high energy neutrons directly interact with a lasing media to obtain a high intensity light source. For example, such a source can provide a high-energy laser output for use in communication applications.

Accordingly, it is an object of the present invention to provide a light source from the direct interaction of fusion neutrons with a lasing medium.

It is another object of the present invention to provide a lasing system effective to use high energy fusion neutrons.

Yet another object is to provide a plurality of fusion neutron sources for exciting a large volume of dense lasing media.

A further object of the present invention is to provide lasing media having a high inelastic scattering cross section with high energy fusion neutrons and which is excited by gamma radiation arising from the collisions.

SUMMARY OF THE INVENTION

To achieve the foregoing and other objects, and in accordance with the purposes of the present invention, as embodied and broadly described herein, the apparatus of this invention may comprise a system for generating light radiation in a preselected lasing medium from a high-energy neutron source. The neutron source is a fusion reactor generating a long pulse of high-energy neutrons. The neutron flux is coupled directly within the lasing medium. The lasing medium includes a first component liquid selected from Group O of the periodic table of elements. The selected liquid has a high inelastic scattering cross section with high energy fusion neutrons and further generates a first output wavelength under excitation produced through interaction with gamma radiation from the inelastic collisions.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE PREFERRED EMBODIMENTS

Figure 1:
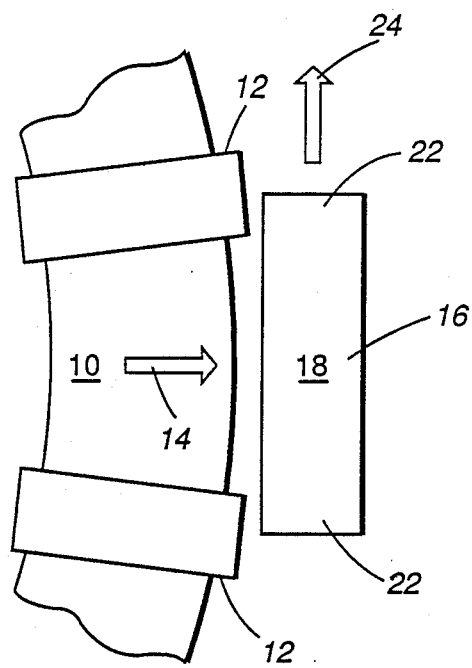
FIG. 1 is a conceptual representation of a fusion-pumped light source having a lasing medium for interacting with fusion neutrons.

As discussed in the prior art, a variety of media may be used to generate a light output when excited by a neutron flux at various threshold values. Table A is illustrative of gaseous laser media which produce outputs from pumping reactions arising from interactions with a thermal neutron flux.

TABLE A

Illustrative Laser Media

| Laser | Pumping Reaction | Wavelength | Thermal Flux Threshold (n/cm²-sec) | Length of Laser Output | Peak Laser Power |
|---|---|---|---|---|---|
| He—Hg | $^{10}B(n,\alpha)^7Li$ | 6150 Å | $\sim 1 \times 10^{16}$ Thresh $10^{14}$ | 400 μsec | $\sim 1$ mW |
| CO | $^{235}U(n,f)ff$ | 9.1–5.6μ | $-5 \times 10^{16}$ | 50 μsec | $>2$ W |
| He—Xe | $^{235}U(n,f)ff$ | 3.5μ | $\sim 3 \times 10^{15}$ | 150 μsec | $>10$ mW |
| Ne—N₂ | $^{235}U(n,f)ff$ and $^{10}B(n,\alpha)^7Li$ | 8629 Å and 9393 Å | $\sim 1 \times 10^{15}$ | 6 msec | $\sim 2$ mW |
| $^3$He—Ar | $^3He(n,p)T$ | 1.79μ | $\sim 2 \times 10^{16}$ | 365 μsec | $\sim 50$ mW |

In one embodiment of the present invention, a tokamak is provided for a fusion neutron source. A tokamak design can be provided which obtains the required neutron density with a neutron pulse having a relatively long pulse duration of high-energy (14MeV) neutrons. The pulse length can be lengthened by increasing the size of the power supply, a routine design matter involving primarily cost considerations with respect to the power supply.

A preferred tokamak design is selected to provide a high magnetic field and large plasma current to provide the requisite plasma density and plasma temperature effective to generate sufficient neutrons to exceed the pumping threshold of the selected laser medium. The plasma energy and the resulting neutron flux density can be further increased by well-known techniques, such as subjecting the plasma to intense neutral particle beams, rf energy, or the addition of solid D-T pellets to the plasma.

A suitable set of tokamak parameters is as follows:

| | |
|---|---|
| Major radius | 2.5 meters |
| Minor radius | .85 meters |
| Elongation factor | 1.3 |
| $B_T$ (force field) | 12T |
| $I_p$ (current) | 10 MA |
| $T_i$ (temperature) | 20 keV |
| n (density) | $5 \times 10^{14}$ cm$^{-3}$ |
| $\tau_E$ (confinement) | 0.5 sec |
| Neutron flux F | $10^{15}$ n/cm² sec |
| Pulse duration | 10 sec. |

Mechanical factors include the major radius (radius of the torus forming the tokamak), minor radius (radius of the plasma tube), and elongation factor (deviation of the plasma tube from a circle). A magnetic field of 12 T is provided to increase the plasma density and hence the neutron flux density to provide a threshold density for the lasing reaction.

It will be appreciated that the above operational design parameters, such as temperature $(T_i)$, plasma density (n) and neutron flux (F), have been individually provided in operational or designed tokamaks. Plasma temperatrues of 20 keV have been reported for the TFTR, "Princeton Tokamak Reaches Record Plasma Ion Temperature," Phys. Today, 19-21 (November 1986). A pulse duration of 10 s is provided, an illustrative pulse duration which has been obtained in operating tokamaks.

By way of illustration, the operating parameters of existing tokamaks, JET and TFTR, and a next generation design tokamak, CIT, ar set out in Table B.

It has also been demonstrated by the Alcator tokamak at MIT that a high magnetic field and very high current density act to increase the plasma density from the tokamak. Deuterium pellets have been injected into the Alcator C tokamak to increase plasma density, Greenwald et al., "Energy Confinement Of High-Density Pellet-Fueled Plasmas In The Alcator C Tokamak," Phys. Rev. Lett. 53, No. 4, 352-355, (July 23, 1984), incorporated herein b reference. The use of neutral particle beam injection and rf heating to maximize plasma temperatures has also been demonstrated. A substantial performance increase of the Tokamak Fusion Test Reactor (TFTR) is shown in Hendel et al., "Measurement of Record Fusion Neutron Yields In the TFTR," submitted at the annual meeting of the American Nuclear Society, (Jun. 7-11, 1987), incorporated herein by reference.

While a tokamak is a fusion neutron source having substantial flexibility in neutron flux generation, other fusion sources may be used. The neutron flux intensities discussed herein are based on a 100 cm coupled length between the fusion neutron source and the lasing media and

TABLE B

Comparison of key plasma parameters.

| | Device | | | |
|---|---|---|---|---|
| Parameter | JET | TFTR | | CIT (Design) |
| R(m) | 2.9 | 2.5 | 2.5 | 1.75 |
| a(m) | 1.25 | .85 | .85 | .55 |
| $B_T$(T) | 3 | 5 | 5 | 10 |
| $n_o(O)$cm$^{-3}$ | $5 \times 10^{13}$ | $10^{13}$ | $10^{14}$ | $5 \times 10^{14}$ |
| $I_p$(MA) | 5 | 1 | 2.5 | 9 |
| $T_i(O)$keV | 5 | 30 | 4 | 10 |
| $\tau_E$(sec) | 1 | .18 | .4 | .5 |
| $n_e\tau_E$(sec · cm$^{-3}$) | $5 \times 10^{13}$ | $1.8 \times 10^{12}$ | $4 \times 10^{13}$ | $2.5 \times 10^{14}$ |
| $S\left(\dfrac{n}{sec}\right)$ | $10^{17}$ | $1.2 \times 10^{18}$ | $5 \times 10^{17}$ | $1.5 \times 10^{20}$ |

TABLE B-continued

Comparison of key plasma parameters.

| Parameter | Device | | |
|---|---|---|---|
| | JET | TFTR | CIT (Design) |
| $F\left(\dfrac{n}{cm^2\ sec}\right)$ | $5 \times 10^{11}$  $1.5 \times 10^{12}$  $6 \times 10^{11}$ | | $9 \times 10^{14}$ |
| *D-T Equivalent Pulse Length | 19 sec | 1–2 sec | 2–4 sec | lower flux intensities are proportional to increased lengths. Other magnetic confinement fusion reactor designs may be used, such as the mirror concept, field reversed configurations, and pinches. Inertial confinement schemes may also be used for proof-of-principle testing.

Referring now to FIG. 1, there is shown a fusion-pumped light source in conceptual form. Tokamak 10 is provided with magnetic coils 12 for stabilizing the plasma. Coils 12 are configured to enable fusion neutron flux 14 to escape tokamak 10 with little moderation such that fusion neutrons 14 are provided at 14 MeV external to tokamak 10. Light source 16 is located adjacent tokamak 10 to receive neutron flux 14 within a lasing medium 18.

As shown in FIG. 1, lasing medium 18 is selected to use the high-energy fusion neutron flux within the volume of lasing medium 18. A high-density lasing medium may be used with the high-energy fusion neutrons to provide a greatly increased laser output arising from the increased mean free path length of the high-energy neutrons over that of fission fragments or other charged particle sources. Further, both liquid and solid laser media may be considered since optical damage to the medium does not occur in the absence of high energy charged particles. Light source 16 may be conventionally provided with mirrors 22 to provide the desired amplification to enable a laser output 24 from light source 16.

Dense lasing media can be formed using a liquid host A liquid selected from Group O of the periodic table of the elements (i.e., a noble "gas": He, Ne, Ar, Kr, Xe, or Rn) can be selected with a high cross section for inelastic scattering with high energy fusion neutrons, e.g., neutrons in the energy range of 2–15 MeV. Inelastic collisions form the predominant first interaction between fusion neutrons at 14 MeV and the host material, with significantly increased gamma ray production over the gamma flux produced predominantly from fission neutron capture reactions. The $\lambda$ radiation is produced predominantly by (n,n'$\lambda$) reactions with an average $\lambda$ energy of about 2 MeV.

The resulting $\lambda$ radiation then acts through Compton and photoelectric processes to further stimulate the host element to gnerate photons. High energy electrons are produced by the Compton and photoelectric processes to produce ion-pairs and excited states in the host material with approximately $5 \times 10^4$ ion-pairs per high energy electron. The excited states decay through photon emission to generate a first output wavelength. Fluorescent radiation is obtained which is an incoherent radiation. Mirrors can be conventionally used to amplify the light to provide lasing action with a coherent output. The first photon output can be used directly as a flashlamp or a laser output, or can be transformed to a different wavelength for a selected function.

Figure 2:
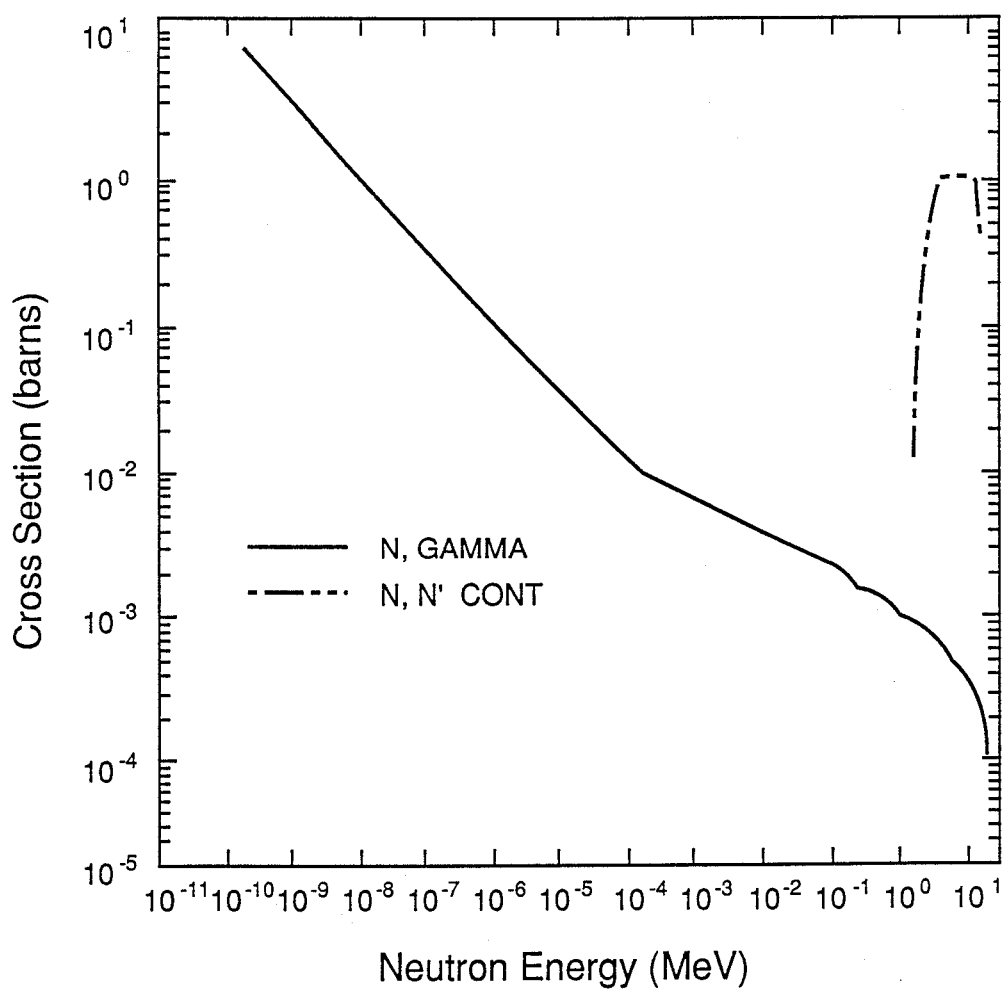
FIG. 2 illustrates the $(n,n')$ and $(n,\lambda)$ cross sections for argon at various neutron energies.

The cross sections for at least two of the elements from Group O, Ar and Xe, have been calculated. As shown in FIG. 2, the cross section of an argon host for inelastic scattering is well matched to the energy output of fusion neutrons, having peak values over an energy range of 2–15 MeV. By way of contrast, the capture cross section is several orders of magnitude less than the inelastic scattering cross section. The inelastic scattering cross section of Xe shows a similar behavior relative to capture. Indeed, the inelastic scattering cross section of Xe is at least an order of magnitude greater than that of Ar in the neutron energy ranges of interest.

The host material, thus, interacts directly with the high energy fusion neutrons to generate photons, which can be used as a broadband fluorescent output, made coherent to act as a laser output, or used to stimulate a second medium for lasing action. Since no fission fragments are generated, a liquid lasing medium can be used.

The output wavelengths of elements in Group O may be in the ultraviolet and not well suited for many applications. The output laser waverlength can be shifted by incorporating a second liquid component which is excited by the first output wavelength and decays by photon emission at a desired wavelength. In one embodiment a XeO laser, formed from a mixture of liquid $N_2O$ and Xe, is provided with a liquid Ar host. The following reactions are believed to occur:

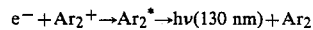

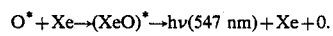

The host (Ar) generated an output (130 nm) effective to produce singlet oxygen for forming an excimer (XeO*), which transitions to produce the second wavelength output (547 nm).

A useful mixture is 99.999% Ar, 40 ppm $N_2O$, and 40 ppm Xe.

This output laser, spectrum resides in the blue-green part of the visible spectrum, a wavelength particularly suited for atmospheric and oceanic propagation. It can be estimated that the pump power threshold for an XeO laser in a liquid Ar host is 13.3 W/cm$^3$ which can be obtained from an incident neutron flux of 14 MeV neutrons of $1.4 \times 10^{15}$ n/cm$^2$·s for a 100 cm long neutron source. Electron beam pumping of XeO in a liquid Ar host is reported by T. R. Loree et al., "Lasing XeO in Liquid Argon," LA-UR-86-0897, incorporated herein by reference.

In another embodiment, the roles of Xe and Ar are reversed. The host material is liquid Xe and the second liquid is formed of $N_2O$ and Ar.

Figure 3:
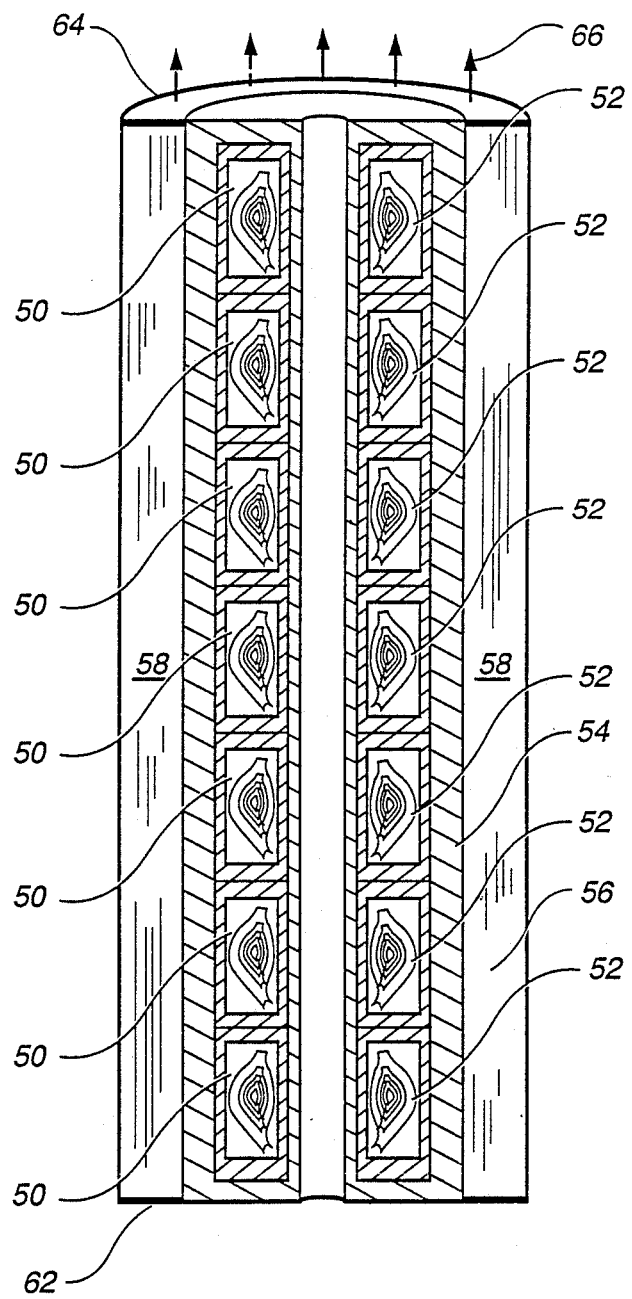
FIG. 3 is a cross-sectional view of a fusion-pumped light source having stacked tokamaks for pumping an annular lasing volume.

To further increase the pumped laser volume for power output, tokamak reactors may be stacked as shown in FIG. 3. A plurality of tokamaks 50 are stacked to form a plurality of plasma volumes 52 for generating fusion neutrons. Toroidal coils 54 stabilize the high density plasmas 52 to obtain neutron flux levels hereinabove discussed. Coils 54 are configured to enable the neutron flux to escape from plasmas 52 and into a surrounding annular laser cavity 56 without significant attenuation.

A suitable lasing medium 58 is disposed in cavity 56. The size of cavity 56 and the density of medium 58 are selected to use the energy in the high energy (14 MeV) neutrons from plasmas 52. Suitable reflecting 62 and partially transmitting 64 optics are provided at the ends of cavity 56 for providing a coherent laser output 66. It should be noted that optics 62 and 64 can be omitted, whereby noncoherent radiation will be generated in the cavity 56 for use as a flashlamp.

A preferred medium 58 is the Ar—$NO_2$—Xe mixture, discussed above. The efficiency of each tokamak system with the XeO laser is estimated to be about 5.5% for converting tokamak input energy to light output energy, due to the more direct conversion of neutron energy to light. Further, the high energy neutrons do not damage the liquid medium, as do fission fragments.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for generating light radiation in a preselected lasing medium, comprising:

fusion means for generating a long pulse of high-energy neutrons with a predetermined neutron flux; and means for directing said neutron flux within said lasing medium, same lasing medium including a first component liquid selected from Group O of the periodic table of the elements, having a high inelastic scattering cross section with neutrons in the high energy range of 2–15 MeV, and generating a first output wavelength from interactions with gamma radiation produced by said inelastic collisions, said neutron flux exciting said lasing medium essentially through inelastic scattering excitations.

2. Apparatus according to claim 1, wherein said preselected lasing medium includes a second lasing medium responsive to said first output for generating a second output wavelength.

3. Apparatus according to claim 1, wherein said first component is Ar.

4. Apparatus according to claim 1, wherein said first component is Xe.

5. Apparatus according to claim 2, wherein said first component is Ar and said second component is a mixture of Xe and $N_2O$.

6. Apparatus according to claim 2, wherein said first component is Xe and said second component is a mixture of Ar and $N_2O$.

7. Apparatus of claim 1, wherein said fusion means includes a plurality of tokamak fusion reactors axially aligned in stacked configuration within said lasing media.

* * * * *